| United States Patent [19] | [11] 3,896,108 |
|---|---|
| Klug | [45] July 22, 1975 |

[54] CARBOXYALKYL MODIFIED ETHYL CELLULOSE

[75] Inventor: Eugene D. Klug, Wilmington, Del.

[73] Assignee: Hercules Incorporated, Wilmington, Del.

[22] Filed: May 10, 1974

[21] Appl. No.: 468,957

[52] U.S. Cl.......... 260/231 A; 106/186; 106/197 C; 117/166; 260/231 CM; 424/35
[51] Int. Cl............................................. C08b 11/00
[58] Field of Search ........ 260/231 A, 231 CM, 232; 106/169, 170, 186, 197 C; 117/166

[56] References Cited
UNITED STATES PATENTS

| 2,693,437 | 11/1954 | Spradling | 106/197 C |
| 2,967,376 | 1/1961 | Scott | 106/197 C |

FOREIGN PATENTS OR APPLICATIONS

| 686,116 | 1/1953 | United Kingdom | 260/232 |
| 696,888 | 9/1953 | United Kingdom | 260/232 |
| 734,924 | 8/1955 | United Kingdom | 260/232 |

*Primary Examiner*—Ronald W. Griffin
*Attorney, Agent, or Firm*—William S. Alexander

[57] ABSTRACT

Cellulose derivatives are described comprising a normally water-insoluble ethyl cellulose having 0.05 to 0.4 carboxyalkyl groups per anhydroglucose unit of the cellulose. These derivatives are insoluble in water and in acid medium but are soluble in basic aqueous media. They also have been found to be thermogelling. The use of these derivatives as coating materials and as shaped objects via forming techniques making use of the thermogelling property is disclosed.

4 Claims, No Drawings

CARBOXYALKYL MODIFIED ETHYL CELLULOSE

This invention relates to ethyl cellulose containing small amounts of a modifying substituent which leads to significant changes in the properties of the ethyl cellulose. More specifically, it relates to normally water-insoluble ethyl cellulose having small amounts of carboxyalkyl substitution whereby it becomes soluble in dilute aqueous alkaline systems. In one specific embodiment, it relates to a process of applying coatings and preparing shaped objects employing such modified ethyl cellulose derivatives.

Ethyl cellulose having an ethoxyl D.S. of about 2.0 and higher is a well-known water-insoluble ether of cellulose. Its durability, toughness, and water-resistant character have led to wide acceptance as a coating material. However, due to its water insolubility it has always had to be applied from an organic solvent medium, e.g., toluene-alcohol. This, of course, is disadvantageous in that such solvents are expensive and, unless recovered, they are environmentally objectionable. Any steps taken to recover the solvents add significantly to the expense of the coating systems in which they are employed.

Now, in accordance with this invention, derivatives of normally water-insoluble ethyl cellulose ethers are provided which are soluble in aqueous media but which otherwise exhibit substantially all of the desirable properties of normally water-insoluble ethyl cellulose. The derivative according to this invention is carboxyalkyl ethyl cellulose having D.S. about 0.05 to 0.40 carboxyalkyl and D.S. at least about 2.0 ethoxyl. The preferred carboxyalkyl substituents are carboxymethyl and carboxyethyl.

The carboxyalkyl ethyl cellulose of this invention differs from the conventional ethyl cellulose from which it is derived principally by being soluble in dilute aqueous alkali. In view of the total insolubility of the unmodified ethyl cellulose in aqueous systems, this is a surprising observation. A product having D.S. 0.2 carboxymethyl, e.g., can form a 1% solution in approximately 0.25% aqueous ammonia at temperatures from about 0° to 25°C. These solutions have been found to be thermogelling. Thus, as heat is applied, the solution increases in viscosity and eventually gels.

Aside from its alkali solubility and related thermogelling capability, the modified ethyl cellulose of this invention is substantially identical to conventional ethyl cellulose. Thus, it is insoluble in neutral or acid aqueous media and soluble in many organic solvents. It exhibits excellent heat and light stability and its films remain tough and flexible at low temperatures. Additionally, its films have good mechanical properties and are resistant to oxygen and water vapor transmission. In the absence of alkali, it is not only water-insoluble, it is also highly resistant to swelling in water.

By virtue of this similarity to ethyl cellulose, the carboxyalkyl ethyl cellulose of this invention is useful in many applications where ethyl cellulose is currently employed. The principal applications for ethyl cellulose are in the coatings field such as for lacquers, varnishes and adhesives. It is also employed in preparing shaped articles. Since ethyl cellulose is normally employed in solution form, the solubility of the modified ethyl cellulose in water at slightly basic pH represents a clear advantage since it allows the application of coatings or the preparation of shaped articles from economically and environmentally preferable aqueous systems.

Any alkaline medium can be employed to dissolve the carboxyalkyl ethyl cellulose of this invention. Inorganic bases such as ammonia, sodium hydroxide, potassium hydroxide or other hydroxides can be used. Organic bases such as low molecular weight water-soluble amines are also applicable.

When a volatile base, such as ammonia, or a low molecular weight organic base, is employed to solubilize the carboxyalkyl ethyl cellulose, the resultant solution can be baked at a slightly elevated temperature so that the base is removed with the water and the modified ethyl cellulose becomes insoluble and highly swell resistant in water. Such a coating, however, can easily be redissolved in dilute aqueous alkali.

The modified ethyl cellulose of this invention thus makes an excellent material for use in environments which can be expected to be neutral or slightly acid. One example of such utility is in coatings or encapsulating materials for enteric medicaments. The coating or encapsulation prevents a release of the medicament until it has passed beyond the acid environment of the stomach to an area of basic pH where its beneficial effect is required.

The carboxyalkyl ethyl cellulose derivatives of this invention can also be employed as binders for reconstituted tobacco. They can be applied from a slightly alkaline aqueous solution. Upon drying, the binder becomes water resistant and does not dissolve in the smoker's mouth.

In preparing shaped objects, including coatings on a substrate, with the modified ethyl cellulose of this invention, several methods of operation can be employed. In the simplest technique, a liquid solution of the modified ethyl cellulose is formed into the desired shape and is simply allowed to dry. This technique is used primarily for coating applications such as paints, varnishes, and lacquers. In this case, it is preferable that the alkaline material be one which is volatile at approximately room temperature such as, e.g., ammonia. If the substrate is heated prior to applying the solution, thermogelling will almost immediately give the solution sufficient body to prevent running or "sagging" while the water and the material which contributes alkalinity are being removed.

The thermogelling property makes the modified ethyl cellulose useful in the dip coating technique where the object being coated is heated to a temperature above the gelling temperature before immersion. The heated object causes the solution with which it comes into contact to gel almost immediately so that it adheres to the heated surface of the object when the object is removed from the solution.

In a specific application of the above dip coating technique, capsules suitable for use as medicament containers can be prepared by dipping hot pins in the shape of capsule halves into the solution. These pins are treated with an appropriate release agent so that the capsule halves can be easily removed therefrom. Capsules, prepared from the modified ethyl cellulose of this invention, can be used advantageously for enteric medicaments as suggested hereinabove.

The modified ethyl cellulose of this invention can be prepared by reacting alkali cellulose with ethyl chloride and either monochloroacetic acid or 2-chloropropionic acid. Reactions of this general type are known in the art for preparing cellulose ethers. In a preferred procedure, pure cellulose is treated with alkali, preferably sodium hydroxide, in the presence of the carboxyalkylating acid until the cellulose is sufficiently swelled and the carboxyalkyl substituent has reacted. Ethyl chloride and additional alkali are then added to accomplish the ethylation. It is also possible to carboxyalkylate a commercial ethyl cellulose by treating it with the carboxyalkylating acid in the presence of alkali.

In preparing the carboxyalkyl ethyl cellulose of this invention according to the preferred process, cellulose is slurried in an organic liquid in which ethyl cellulose is insoluble and the carboxyalkylating acid and 50% NaOH are added to the slurry. The concentration of NaOH is sufficient to assure that the alkali/cellulose ratio is about 0.04 to 0.95 and the molar ratio of alkali to carboxyalkylating acid is slightly greater than 2.0/1. This slurry is agitated for sufficient time at room temperature to permit maximum swelling of the cellulose. At this point, additional alkali is added to adjust the alkali/cellulose ratio to about 3 to 5 and the water/cellulose ratio to about 2.5 to 5. The temperature is raised slowly to 130°C., maintained at this point, and agitation is continued until substantially all of the ethyl chloride has reacted. Workup is accomplished by decanting the organic diluent, followed by neutralization of residual alkali to a pH of 3-4 and washing with hot water.

The following examples will illustrate the preparation of the carboxyalkyl ethyl cellulose ethers of this invention. Parts and percentages are by weight unless otherwise indicated.

EXAMPLE 1

Twelve parts of chemical wood pulp was slurried in 155 parts of dioxane, 12.9 parts water and 4 parts monochloroacetic acid. The slurry was stirred vigorously, 12.8 parts 50% NaOH solution was added, and stirring was continued for 30 minutes. At this point, another 85.1 parts of 50% NaOH was added, followed by 10 minutes of vigorous stirring. The slurry was transferred to an autoclave chilled in an ice bath, 23.9 parts of solid NaOH was added and the autoclave was allowed to stand in the ice bath. After 1. hour, 58.5 parts of ethyl chloride was added and the autoclave was transferred to an oil bath. As the autoclave was tumbled in the oil bath, the temperature was raised to 130°C. over 1 hour and then held at that point for 16 hours.

After 16 hours, the dioxane and the other liquid components were decanted and the product was washed twice by stirring in water at 85° to 90°C. The pH of the third hot aqueous wash was lowered to 3 by addition of acetic acid. The product was then washed at room temperature, also at pH 3. The product was then air dried at 70°C.

The carboxymethyl ethyl cellulose thus prepared has a D.S. 2.3 ethoxyl and 0.29 carboxymethyl. It formed a clear 1% solution in 0.25% aqueous ammonia at room temperature and gelled at 43°C. Upon cooling to room temperature, the gel reverted to its original fluid state. The carboxymethyl ethyl cellulose was soluble up to at least 5% concentration in a 4:1 toluene-alcohol mixture.

EXAMPLE 2

The procedure of Example 1 was repeated except that only 2 parts of monochloroacetic acid was used. This product had a D.S. 0.14 carboxymethyl. It was not soluble in 0.25 % aqueous ammonia at room temperature but dissolved readily to form a 1% solution on cooling to 5°C. This solution gelled when it was warmed to room temperature.

EXAMPLE 3

Carboxymethyl cellulose of D.S. 0.40 (15 parts) was slurried in 180 parts of dioxane to which was added 16.0 parts of 50% sodium hydroxide. This was agitated for 30 minutes, at which time another 108.2 parts of 50% sodium hydroxide was added, followed by another 10 minutes of agitation. The slurry was transferred to an autoclave, 30.6 parts of solid, finely ground sodium hydroxide was added and the autoclave placed in an ice bath to cool. After 1 hour, 73.3 parts of ethyl chloride was added to the reaction mass and the autoclave was tumbled in an oil bath which was heated to 130°C. in the course of 1 hour.

After about 16 hours reaction time at 130°C., the liquid phase was decanted and the product was washed 4 times with hot water, the third and fourth washes being conducted at a pH of 3. The product was then air dried at 70°C.

The carboxymethyl ethyl cellulose had a D.S. 2.43 ethoxyl. It was soluble in a 4:1 toluene-alcohol mixture and at the 1% level in a 0.25% aqueous ammonia at room temperature and also at 4°C. The 1% solution reached maximum thickness, but did not gel at 44°C.

EXAMPLES 4 THROUGH 7

Using the procedure set forth in Example 1, a series of carboxymethyl ethyl celluloses was prepared having different carboxymethyl and ethoxyl D.S. Properties of these materials are described in the following table.

| Example No. | D.S. Carboxymethyl | D.S. Ethoxyl | Solubility[1] Toluene:Alcohol | 0.25% Ammonia[2] R.T. | 0.25% Ammonia[2] 0°C. | Gelation Temp.,[2] °C. |
|---|---|---|---|---|---|---|
| 4 | 0.22 | 2.20 | P.S. | P.S.[3] | S[4] | 55[5] |
| 5 | 0.28 | 2.24 | S | S | S | 42[5] |
| 6 | 0.26 | 2.29 | S | S | S | 45[5] |
| 7 | 0.24 | 2.39 | S | S | S | 34 |

[1] 5% solution
[2] 1% solution
[3] Soluble, but not to 1% level
[4] Solubility remained on warming to R.T.
[5] Thickened but did not gel; however, a 2% solution 0.5% acetic acid did gel.

EXAMPLE 8

The following mixture was stirred for 2 hours at 15°C. (all parts by weight):
4 parts finely divided chemical cotton
40 parts 87% isopropanol 1.64 parts 72% aqueous NaOH (1.18 parts NaOH, 0.46 part H₂O)

It was then heated to 70°C. and a solution of 1.32 parts monochloroacetic acid in 4 parts 87% isopropanol was added. The reaction mixture was heated for 1 hour at 70°C. with continued stirring. It was then cooled to room temperature and the NaOH in the reaction mixture was neutralized with HCl. The product was washed with 80% ethanol, centrifuged and the centrifuge cake added to a pressure reactor together with 45.5 parts of 55% aqueous NaOH and 24 parts ethyl chloride. The mixture was stirred and pressurized with air to 20 p.s.i. The reaction mixture was heated with continued agitation to 140°C. over a period of 3 hours and held at 140°C. for 1 hour. The volatile solids were then boiled off and the product purified as described in Example 1. Analysis showed that it had an ethoxyl D.S. of 2.04 and a carboxymethyl D.S. of 0.315. A 1% solution in 0.5% aqueous $NH_3$ was clear and smooth after chilling and had a gelation temperature of 54°C.

A 5% solution of this product in 2.6% aqueous $NH_3$ was prepared by chilling. Two mil films were cast from this solution and dried at room temperature plus 4 hours at 70°C. These films were then insoluble in water. The films were compared with films of the same thickness of two commercial grades of ethyl cellulose (Hercules G50 and G100, Hercules Incorporated, Wilmington, Delaware). The latter were cast from solutions in toluene-alcohol (4:1). The following table shows that the modified ethyl cellulose was comparable to the other two in film tensile strength, elongation and modulus. It was comparable to the G50 in MIT fold endurance and was much superior to both films in resistance to transmission of oxygen and water vapor. The latter results are unexpected and surprising.

Film Properties

| Designation: | CMEC | EC G-50 | EC G-100 |
| --- | --- | --- | --- |
| Tensile Properties[1] | | | |
| Strength (psi) | 12,600±1,000 | 11,400±700 | 13,400±900 |
| Elongation (%) | 37.0±6.0 | 38.0±2.0 | 37.9±3.0 |
| Modulus (psi) | 338,000±20,000 | 307,000±20,000 | 344,000±20,000 |
| MIT Fold Endurance | 1650 | 1860 | 4240 |
| (double fold) [2] | high 2002 | high 2175 | high 5173 |
| | low 1426 | low 1503 | low 3249 |
| Permeability | | | |
| Oxygen transmission[3] (cc/100 in.²/24 hr.) | 290 | 1210 | 1487 |
| Water vapor transmission (gm/100 in.² per 24 hr.)[4] | 6.4 | 10.0 | 10.3 |

[1] Span 2 in. crosshead speed 2 in./min. chart 10 in./min.
[2] ASTM-D 2176, tension 200 gm.
[3] ASTM-D 1436
[4] ASTM-E 96, Procedure B
Note: Tests run on 2 mil films.

EXAMPLES 9–11

The procedure employed was similar to that given in Example 1 except for the use of 2-chloropropionic acid instead of monochloroacetic acid. The following table summarizes the data (all parts by weight):

| Designation | 9 | 10 | 11 |
| --- | --- | --- | --- |
| Cellulose | 12.0 | 12.0 | 12.0 |
| Dioxan | 155 | 155 | 155 |
| Water | 12.9 | 12.9 | 12.9 |
| 2-Chloropropionic acid | 1.8 | 3.6 | 4.6 |
| First 50% NaOH addition | 12.8 | 12.8 | 12.8 |
| Second 50% NaOH addition | 86.3 | 86.3 | 86.3 |
| Solid NaOH added | 25.2 | 25.2 | 25.2 |
| Ethyl chloride | 58.5 | 58.5 | 58.5 |
| Carboxyethyl D.S. | 0.05 | 0.12 | 0.14 |
| Ethoxyl D.S. | 2.33 | 2.33 | 2.33 |

The products were purified as described in Example 1. One per cent dispersions in 0.25% aqueous $NH_3$ were prepared. At room temperature, the products were insoluble. However, when the solutions were chilled to 5°C., clear smooth solutions were formed. On being heated slowly, they gradually thickened until they gelled. The gelation temperatures were as follows:

| | 9 | 10 | 11 |
| --- | --- | --- | --- |
| Gelation temperature °C. | 30.0 | 30.0 | 44.0 |

A film cast from the aqueous $NH_3$ solution of Example 11 was dried overnight at 35°C. and 2 hours at 70°C. After this treatment, it was insoluble and did not swell in water.

What I claim and desire to protect by Letters Patent is:

1. A carboxyalkyl ethyl cellulose having an ethoxyl D.S. of about 2.0 to 2.8 and a carboxyalkyl D.S. of about 0.05 to 0.5 and selected from the class consisting of carboxymethyl and carboxyethyl, said modified ethyl cellulose being soluble in dilute aqueous bases and insoluble in neutral or acid aqueous medium.

2. A method of preparing a shaped object which comprises providing a solution of carboxyalkyl ethyl cellulose in a dilute alkaline aqueous system, said carboxyalkyl ethyl cellulose being selected from the class consisting of carboxymethyl and carboxyethyl ethyl cellulose and having an ethoxyl D.S. of about 2.0 to 2.8 and a carboxyalkyl D.S. of about 0.05 to 0.5, forming said solution to the desired shape, and drying the formed solution under conditions whereby the material which contributes alkalinity to the aqueous phase is removed.

3. The method of claim 2 where the shaped object is a coating on a substrate.

4. The method of claim 2 where the shaped object is formed by dipping a hot object of the desired shape into the solution and withdrawing the same with a coating of gelled carboxyalkyl ethyl cellulose thereon.

* * * * *